(12) United States Patent
Willburger et al.

(10) Patent No.: US 10,820,600 B2
(45) Date of Patent: Nov. 3, 2020

(54) DEVICE AND METHOD FOR TRANSFERRING SAUSAGE PORTIONS

(71) Applicant: Albert Handtmann Maschinenfabrik GmbH & Co. KG, Biberach (DE)

(72) Inventors: Peter Willburger, Baindt (DE); Michael Heim, Biberach (DE); Michael Fuergut, Biberach (DE)

(73) Assignee: ALBERT HANDTMANN MASCHINENFABRIK GMBH & CO. KG, Biberach (DE)

( * ) Notice: Subject to any disclaimer, the term of this patent is extended or adjusted under 35 U.S.C. 154(b) by 868 days.

(21) Appl. No.: 15/334,163

(22) Filed: Oct. 25, 2016

(65) Prior Publication Data

US 2017/0112150 A1    Apr. 27, 2017

(30) Foreign Application Priority Data

Oct. 26, 2015  (EP) ..................................... 15191384

(51) Int. Cl.
| | | |
|---|---|---|
| *A22C 11/00* | (2006.01) | |
| *A22C 11/02* | (2006.01) | |
| *B65G 47/84* | (2006.01) | |
| *B65G 47/82* | (2006.01) | |
| *B65G 15/14* | (2006.01) | |
| *B65G 47/57* | (2006.01) | |
| *A23L 13/60* | (2016.01) | |

(52) U.S. Cl.
CPC ............ *A22C 11/02* (2013.01); *A22C 11/008* (2013.01); *A23L 13/62* (2016.08); *A23L 13/65* (2016.08); *B65G 15/14* (2013.01); *B65G 47/57* (2013.01); *B65G 47/82* (2013.01); *B65G 47/841* (2013.01); *B65G 47/846* (2013.01)

(58) Field of Classification Search
CPC ........ A22C 11/00; A22C 11/008; A22C 11/02
USPC .......................................... 452/30–32, 35, 51
See application file for complete search history.

(56) References Cited

U.S. PATENT DOCUMENTS

| | | | |
|---|---|---|---|
| 4,902,184 A | | 2/1990 | Fritz |
| 5,057,055 A | * | 10/1991 | Michaud .............. A22C 11/008 452/182 |
| 9,504,263 B2 | * | 11/2016 | Meggelaars .......... B65B 35/243 |

(Continued)

FOREIGN PATENT DOCUMENTS

| | | |
|---|---|---|
| CN | 1490229 A | 4/2004 |
| CN | 201873310 U | 6/2011 |

(Continued)

OTHER PUBLICATIONS

Japan Patent Office, Office Action Issued in Application No. 2016-201806, dated Aug. 29, 2017, 12 pages.

(Continued)

*Primary Examiner* — Richard T Price, Jr.
(74) *Attorney, Agent, or Firm* — McCoy Russell LLP (57) ABSTRACT

The present disclosure relates to a device and a method for transferring sausage portions with a first transport device for transporting the sausage portions, an ejection device for pushing the sausage portions from a first transport device to a second transport device, which is configured as a drum or fan belt. The first transport device has a lower and an upper circumferential transport means, between which the sausage portions are transported.

12 Claims, 7 Drawing Sheets

(56) References Cited

U.S. PATENT DOCUMENTS

| | | | | |
|---|---|---|---|---|
| 2005/0079813 A1* | 4/2005 | Hergott | ................ | A22C 11/02 |
| | | | | 452/31 |
| 2006/0183413 A1 | 8/2006 | Florindo et al. | | |
| 2006/0240754 A1* | 10/2006 | Reutter | ............... | A22C 11/008 |
| | | | | 452/30 |
| 2014/0106654 A1* | 4/2014 | Meggelaars | ............ | B65B 19/34 |
| | | | | 452/51 |
| 2016/0143300 A1* | 5/2016 | Willburger | ......... | A22C 17/0093 |
| | | | | 452/51 |

FOREIGN PATENT DOCUMENTS

| | | |
|---|---|---|
| CN | 102452487 A | 5/2012 |
| DE | 19821108 A1 | 11/1999 |
| DE | 102008012783 A1 | 9/2009 |
| EP | 1712135 B1 | 8/2007 |
| JP | S5489899 A | 7/1979 |
| JP | S60145116 U | 9/1985 |
| JP | H0551127 A | 3/1993 |
| JP | 2006288397 A | 10/2006 |
| JP | 2007084313 A | 4/2007 |
| WO | 2012144890 A1 | 10/2012 |

OTHER PUBLICATIONS

State Intellectual Property Office of the People's Republic of China, Office Action and Search Report Issued in Application No. 201610947097.6, dated Oct. 26, 2018, 21 pages. (Submitted with Partial Translation).

Japan Patent Office, Office Action Issued in Application No. 2016-201806, dated Apr. 17, 2018, 14 pages.

* cited by examiner

DEVICE AND METHOD FOR TRANSFERRING SAUSAGE PORTIONS

CROSS-REFERENCE TO RELATED APPLICATIONS

The present application claims priority to European Patent Application No. 15 191 384.5, entitled "DEVICE AND METHOD FOR TRANSFERRING SAUSAGE PORTIONS," filed Oct. 26, 2015. The entire contents of the above-cited application are hereby incorporated by reference for all purposes.

TECHNICAL FIELD

The present disclosure relates to a device and method for transferring sausage portions.

BACKGROUND AND SUMMARY

From EP 1 712 135 B1, a device for the ordered deposition of parted sausage portions at one or several defined points of an accelerating device into a drum is already known. The disadvantage of common devices is that the sausage portions due to external influences, (e.g. air flow, vibrations, etc.) or due to internal influences (e.g. bending, change of form due to internal stress, etc.) may fall down before the transfer to the drum or may lie lopsided on the conveyer so that an ordered arrangement is not possible. Therefore, frequently, difficulties occur regarding the correct arrangement of the sausages. On this basis, the underlying technical problem of the present disclosure is to provide a device and a method for transferring single or several sausage portions from a first transport device to a second transport device in order to allow an improved and reliable transfer of the sausage portions.

For this present disclosure, the term "sausage portion" means a single sausage, whereby also several sausage portions, i.e. single sausages, which are transported in a row in transport direction on the first transport device, simultaneously may be sorted out by the ejection device to the second transport device. The single portions, i.e. single sausages, thereby may be separated from one another or may be available as sausage chain.

The sausage portions are transported with a first transport device for transporting the sausage portions. By means of an ejection device, the sausage portions from the first transport device may be pushed to a second transport device, which is configured as a drum or fan belt. According to the present disclosure, the first transport device is configured such that it comprises a lower and upper circumferential transport means, between which the sausage portions may be transported. Therefore, the transported sausages may be held reliably in their position before and during the transfer to the second transport device. The sausage portions, thus, may not fall down during the transport on the first transport device and may also not be shifted so that undesired relative movements may not occur and the sausage portions may be correctly positioned. Therefore, arbitrary grouping orders can be exactly carried out. Even if the sausage portions are bent or have a modified form, they may be reliably transported and transferred. Thus, a high positioning accuracy during the transfer into the second transport device is achieved.

According to the present disclosure, at least a first conveyer device per second conveyer device may be provided—however, also several first conveyer devices per second conveyer devices may be possible. Every first conveyer device (independent of the fact if one or several are arranged), thereby also may have at least one or respectively several ejection devices.

The arrangement according to the present disclosure inter alia allows that the sausages oriented in longitudinal direction may be transported with a first transport device and simultaneously, may be pushed sideways via an ejection device to a drum or a fan belt, whereby, if desired, also a part of the sausages pass the ejection device and may leave the device at the end of the first transport device—oriented in the first transport device.

It is preferred that the first and second transport means are configured as conveyer belts. In one example, their distance to each other is adjustable. Thus, the distance of the transport means may exactly be adapted to the sausage caliber, i.e. to the diameter of the sausage portions such way that the sausage portions may be held reliably without getting damaged simultaneously. Therefore, the device may be used for different processes and sausage calibers.

In one example, the device comprises a control device, which controls the velocities of the first and/or second transport device and/or ejection device, in particular adjusts them one to another. The velocity of the first and second transport device, thus, is variable. The velocity of the first and second transport device also can be adapted to the velocity of a further transport device, which supplies the sausage portions to the device. The drives of the first and second transport means may also be mechanically coupled so that both transport means mandatorily have the same velocity.

In one embodiment, the ejection device is configured such that it may move to and fro between the first and second transport means, i.e. that it may move between the transport units. Thus, it is possible that the sausage portions may be sorted during the standstill of the first transport device or during the transport of the sausage portions in transport direction TR2.

According to one embodiment, several ejection devices are arranged one after the other at the first transport device. Thereby, the sorting may occur to one or an opposite direction. Thus, different grouping orders may be realized.

In one example, if the first transport device is arranged laterally inclined, preferably around the longitudinal axis of the sausages and/or a middle axis L of the first transport device, i.e. that the bearing surface of the transport means are oriented laterally to a horizontal plane. Due to this, the first transport device may be arranged inclined and, thus, closer to the drum and/or the fan belt. Due to the inclined arrangement of the first transport device, the first transport device may be arranged at different positions of the circumference of the second transport device. The sausage portions, thus, may be transferred more gently into accommodation compartments of the second transport device. The bearing surface of the transport means now is not horizontally oriented, but inclined. This is possible, as the sausage portions are held by the first and second transport means and cannot roll off the conveyer belt.

It is possible that several first transport devices may be arranged at several positions of the circumference of the second transport device allowing that several product streams can be brought together or different products can be grouped together.

According to the present disclosure, the second transport device, i.e. the drum or the fan belt, has several circumferential accommodation compartments, which are covered by a cover extending at least to a part of the circumference of the second transport device. At positions, at which sausage portions are supplied or discharged, the cover has corresponding openings.

In one example, the cover may be configured as a cover which is running parallel to the drum or the fan belt, and in one example, as running parallel belt or roller carpet. Thus, during the transport of the sausage portions, there is not or only a slight relative movement between cover and sausage portion that in turn leads to a particularly gentle transfer and transport of the sausage portions. If the cover is driven, the velocity is adjusted such that the relative velocity between sausage portion and/or drum and cover as possible approaches to zero.

According to the present disclosure, the first transport device transports the sausages in a first transport direction TR1 along the longitudinal direction of the sausage portions and the ejection device sorts out the sausages in a second transport direction TR2, which passes at an angle of 45° to 135°, preferable at an angle of 80° to 100°, in particular 90° to the first transport direction TR1.

Regarding the method according to the present disclosure for transferring sausages from a first transport device to a second transport device, the second transport device may be configured as drum or fan belt. The sausages may be transported along their longitudinal direction between an upper and a lower circumferential transport means of the first transport device. The sausage portions then may be pushed sideways from the first transport device into the second transport device by an ejection device.

The distance a of the transport means is thereby previously adjusted depending on the sausage caliber, in particular to a distance a in the center of the bearing surfaces (viewed in direction of the width of the bearing surface) of 70% to 100% of the sausage caliber, i.e. the diameter of the sausage. During sorting, the ejection device moves in a range between the first and second transport means. The sausage portions preferably may be obliquely pushed at an angle to the horizontal plane into the accommodation compartments of the second transport device, in particular at an angle of between 0° and 180°. This allows that the sausage portions may be transferred explicitly gentle and that the distance between the first transport device and the second transport device can be minimized.

In one example, if the sausage portions at several positions arranged on the circumferential of corresponding several first transport devices may be pushed into the accommodation compartments of the second transport device.

The present disclosure further relates to a filling machine for the manufacturing of sausages with a funnel and a filling pipe as well as a device.

The present disclosure in the following is illustrated by referring to the following Figs.

DETAILED DESCRIPTION

Figure 4:
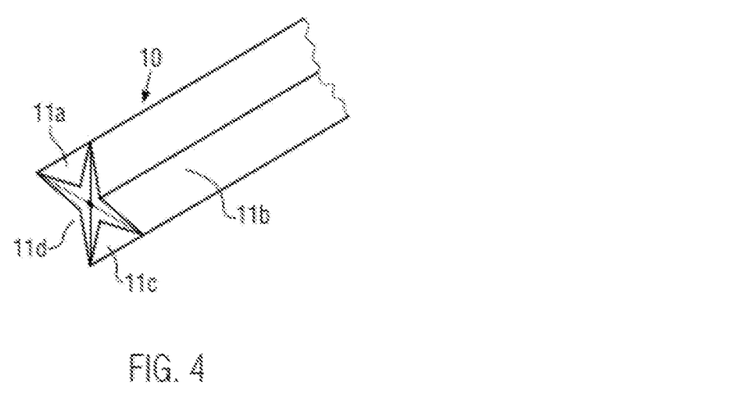
FIG. 4 shows a perspective illustration of a second transport device, which is configured as drum according to the present disclosure.
Figure 5A:
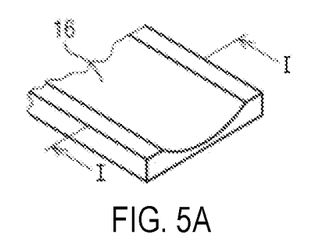
FIG. 5A coarsely shows a schematic of the bearing surface of a lower transport means according to the present disclosure.
Figure 5B:
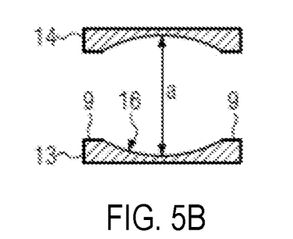
FIG. 5B coarsely shows a schematic of a cross section through a first transport device.
Figure 5C:
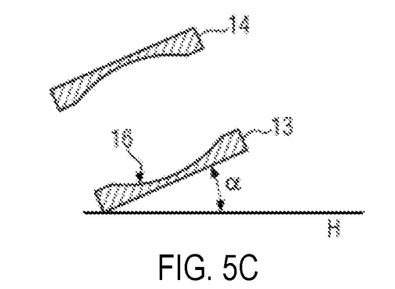
FIG. 5C shows the transport device of FIG. 5B with a bearing surface inclined to a horizontal surface.
Figure 6:
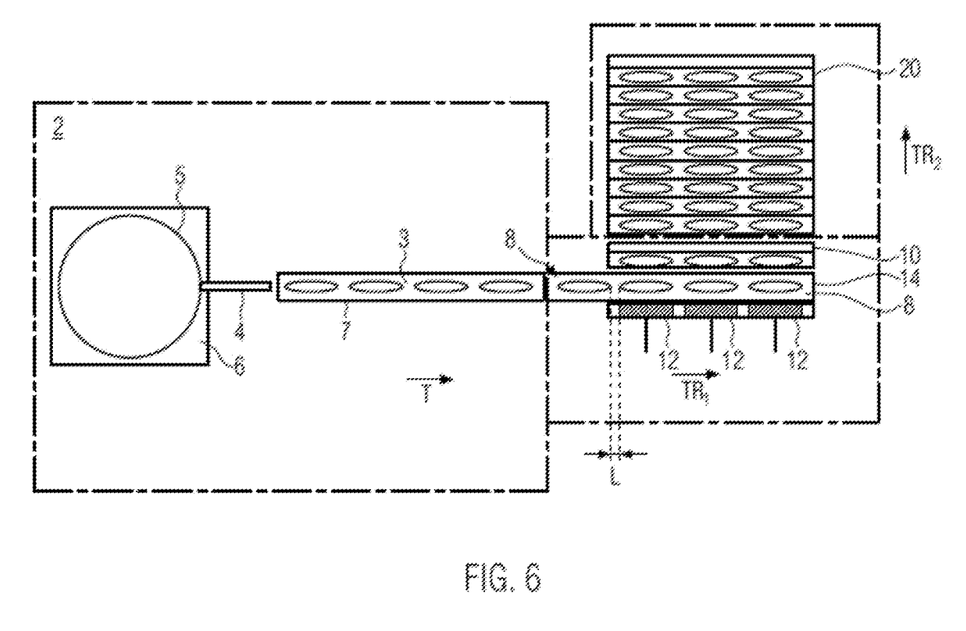
FIG. 6 shows a top view of a filling machine according to an embodiment of the present disclosure.

For purposes of discussion, FIGS. 1-11 will be described collectively. FIG. 6 shows a top view of a filling machine according to the present disclosure. A filling machine has, e.g., a machine housing 6 and a hopper 5 for filling the pasty material (e.g. sausage meat) as well as a filling tube 4, in which the sausage meat is transported into a filling tube 4 by means of a conveyer device (e.g. a sliding vane pump). The pasty material may be filled in a known manner into sausage sleeves and then for example divided up by displacement elements into single sausages and optionally also twisted off by a twist-off device (not shown). The single sausages thus produced can then be cut by a not shown parting unit into single sausage portions. The single sausage portions may also comprise chains of sausages with a certain number of single sausages. In FIG. 6, the sausages may be subdivided into single sausages by the parting unit 3. The parting unit 3 here may be integrated into a transport device 7. The transport device 7 transports the sausages in the transport direction T to the device according to the present disclosure.

The sausage portions 1 coming from the filling machine 2 are accepted by the first transport device 8 and transported aligned along their longitudinal axis in transport direction $TR_1$. Thereby, the first transport device 8 may at least partly run faster than the transport device 7 of the filling machine 2, such that a gap L arises between the single sausage portions 1. Here, either the first transport device 8 can move faster than the transport device 7 of the filling machine 2 or the first transport device 8 can briefly run faster than the transport device 7 of the filling machine during the transfer of a sausage portion 1 or during the transfer of a parting point between two sausage portions 1 so that a gap L arises.

Figure 1:
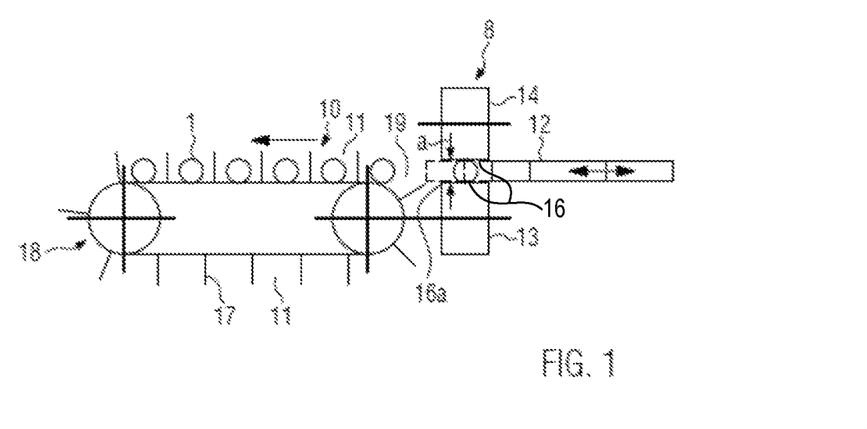
FIG. 1 coarsely shows a schematic longitudinal section through a device according to the first embodiment of the present disclosure.
Figure 2:
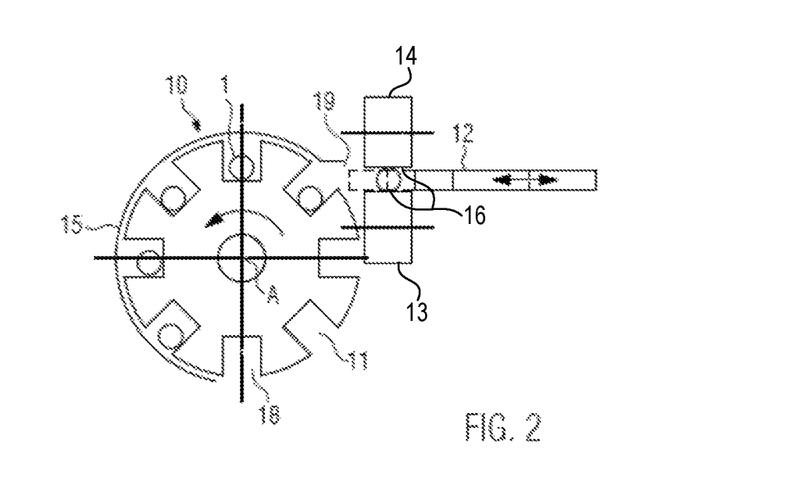
FIG. 2 coarsely shows a schematic longitudinal section through a device according to the second embodiment of the present disclosure.

The first transport device 8 comprises, as derivable from FIGS. 1 and 2, two transport means 13, 14 lying on top of each other, which are here e.g. configured as circumferential conveyer belts. The sausage portions 1 are thereby arranged between the transport means 13, 14 and are held and transported by the transport means 13, 14. The distance between the transport means 13, 14, thereby is in particular continuously adjustable such that a sausage can be reliably held and transported. Put another way, a distance a between both transport means (e.g., between a lower circumferential transport means and an upper circumferential transport means). The distance a of both transport means to each other and/or the distance a between the bearing surfaces 16 of the transport means may be in a range of 70% to 100% of the sausage caliber. As derivable from FIG. 5A-C, the bearing surface may not only be configured flatly, but may also here comprise e.g. a concave recess, which is limited by lateral belt guides 9. The distance a here is considered to be the maximal distance a in the center of the bearing surface between the guides 9. In the event of an even bearing surface 16, the distance a is constant (with the exception of the optionally provided edge guides). The distance a preferably can be adjusted such that it lies in a range of 70% to 100% of the sausage caliber.

The device further comprises at least one ejection device 12, in FIG. 6 e.g. three thereof, for pushing the sausage portions from the first transport device 8 to a second transport device 10, which may be configured as magazine drum or fan belt. Thus, the incoming single sausage portions may e.g. be one after the other pushed from the first transport device. The ejection device 12 here is respectively configured as to and fro movable slider, which may move to and fro between the lower and the upper transport means 13, 14 and, thus, can push the sausage portion 1 into a second transport direction TR$_2$. Put another way, the ejection device 12 may move towards second transport device 10 and away from second transport device 10 to push the sausage portions 1 from transport device 8 to transport device 10, and the ejection device 12 may move in between upper transport means 14 and lower transport means 13. The ejection device in fact pushes the sausage portions to the second transport device 10 into corresponding accommodation compartments 11.

In FIG. 1, the second transport device 10 may be configured as fan belt 10, which may comprise a circumferential belt as well as several partition walls 17 evenly distributed around the circumference, between which the accommodation compartments 11 are formed. As in particular derivable from FIG. 1, the ejection device 12, respectively its front sliding area, moves towards the outer edge 16a of the transport means 13, 14, which is facing the second transport device 10. The slider, however, only moves so far that it does not collide with a partition wall. Thus, the sausage portions may reliably be inserted in the accommodation compartments 11. In this embodiment, the first transport device 8 is located sideways next to the second transport device 10, whereby the bearing surface 16 of the lower transport means 13 basically is on the same level as the bearing surface of the second transport means 10, which is horizontally oriented. In an outlet area 18, the sausage portions again may be ejected.

Figure 11:
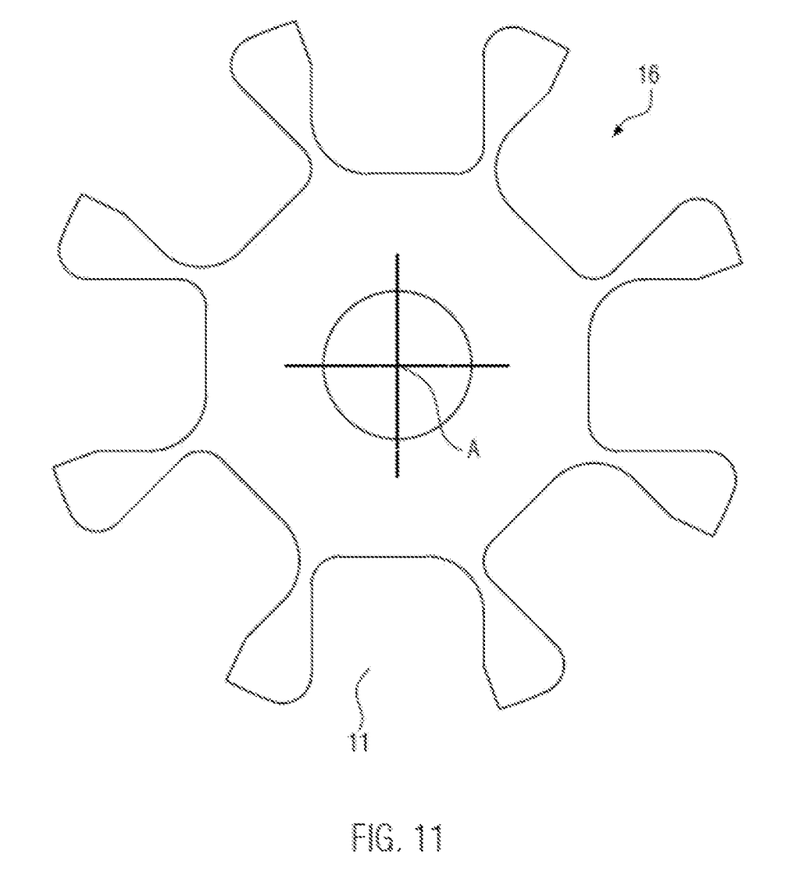
FIG. 11 coarsely shows a schematic longitudinal section through a drum according to the present disclosure.

Alternatively, as shown in FIG. 2, the second transport device 10 may also be configured as drum, which rotates around an axis A and which has several circumferentially distributed accommodation compartments 11, into which within an accommodation area 19, sausage portions 1 are pushed via the ejection device 12. As shown in FIG. 4, the drum also can be configured as drum magazine with several longitudinal grooves 11a, b, c, d in order to accommodate the sausage portions 1. FIG. 11, as well, shows a possible embodiment of the accommodation compartments 11. The sausage portions 1 are transported in the accommodation compartments 11 in the arrow direction and are as well, as shown in FIG. 1, discharged to an outlet area 18. As shown in FIG. 6, the sausages thereby may e.g. be rendered to a further conveyer belt 20. The sausage portions may also be rendered into corresponding accommodation containers and/or bowls.

As in particular derivable from FIG. 2, the second transport device 10 preferably comprises a cover 15, which at least covers a part of the circumference of the second transport device. The cover at least omits one section within the accommodation area 19, in which the sausage portions 1 are pushed from the ejection device 12 and, moreover, has a recess at the outlet area 18, at which the sausage portions leave the transport device. It is also not necessary to provide a cover between the outlet area 18 and the inlet area 19.

Figure 9:
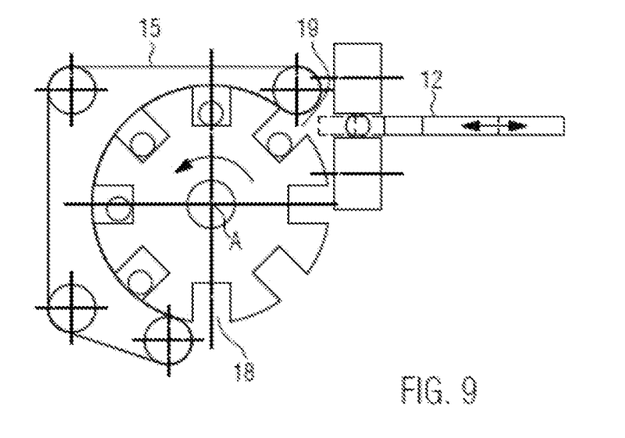
FIG. 9 coarsely shows a schematic of a further longitudinal section according to a further embodiment according to the present disclosure with parallel running cover means.

As in particular shown in FIG. 9, the cover 15 may also be configured as parallel running driven cover, here e.g. as parallel running belt 15. This involves the advantage that the relative velocity between the second transport device 10, i.e. also the sausage portions transported along therewith and the cover 15 may be minimized and/or reduced to zero. This, in particular is advantageous in the lower area of the transport device 10, as it is possible here that the sausage portion 1 comes into contact with the cover 15 due to force of gravity. The parallel running cover 15 allows a particularly careful transporting of the sausage portions. Also the fan belt as shown in FIG. 1, may, even if it is not shown, be configured as cover sheet and at least extends to a part of the circumference of the second transport device and at least is opened in the inlet and outlet area 18, 19, or, however, as shown in FIG. 9, is configured as parallel running cover 15. Viewed from an area behind the accommodation area 19 to an area in front of the outlet area 18, the parallel running cover extends in rotation direction of the second transport device.

Figure 3:
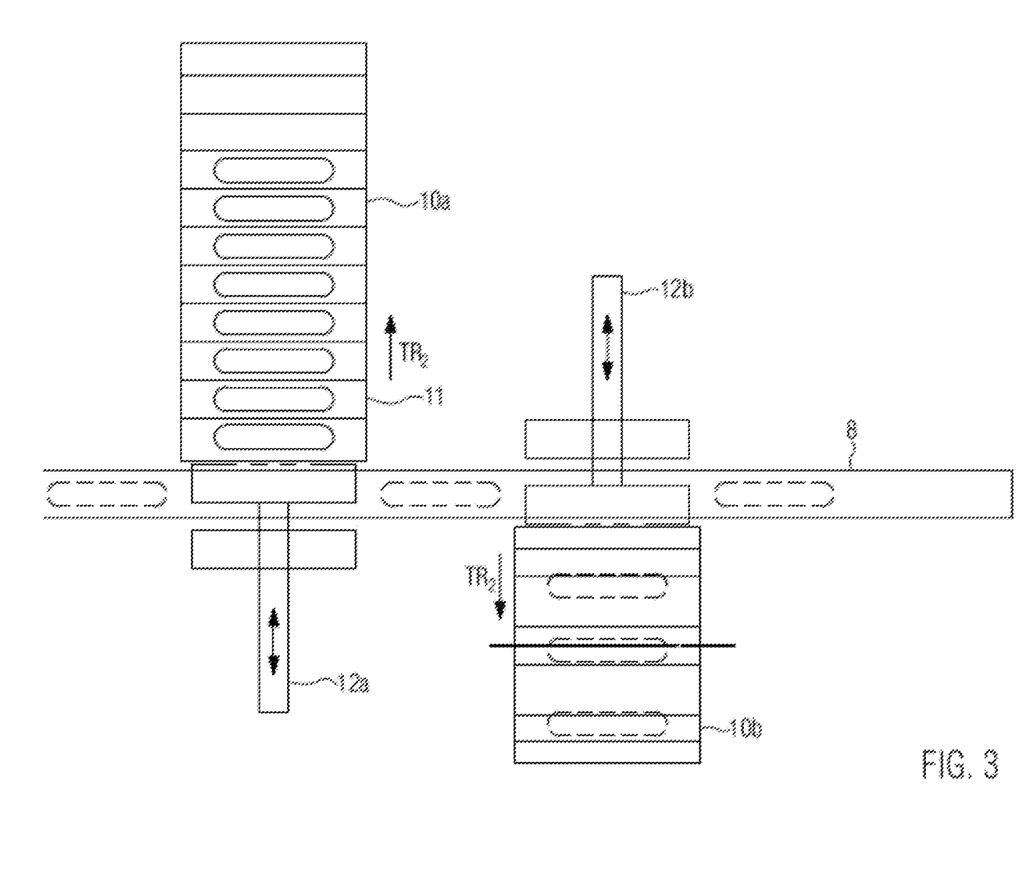
FIG. 3 coarsely shows a schematic top view of a device according to the present disclosure according to a further embodiment with two ejection devices.

FIG. 3 shows a top view of a device according to the present disclosure. In the Fig. on the left-hand side, the first transport device 8 is recognizable as well as an ejection device 12a, which pushes the sausage portions 1 in a direction TR$_2$ into the accommodation compartments 11 of a second transport device 10, here e.g. a fan belt 10a.

Additionally or alternatively, the ejection device 12b here is arranged on the other side of the transport device 8, which pushes here the sausage portions 1 into the second transport device 10b, which is for example configured as drum. Thereby, the ejection direction TR$_2$ is opposite to the direction TR$_2$ of the first ejection device 12a.

Thus, this means that for a first transport device 8 several ejection devices and at least a further second transport device 10 or, however, also several second transport devices 10a, b may be provided.

Figures 7, 10:
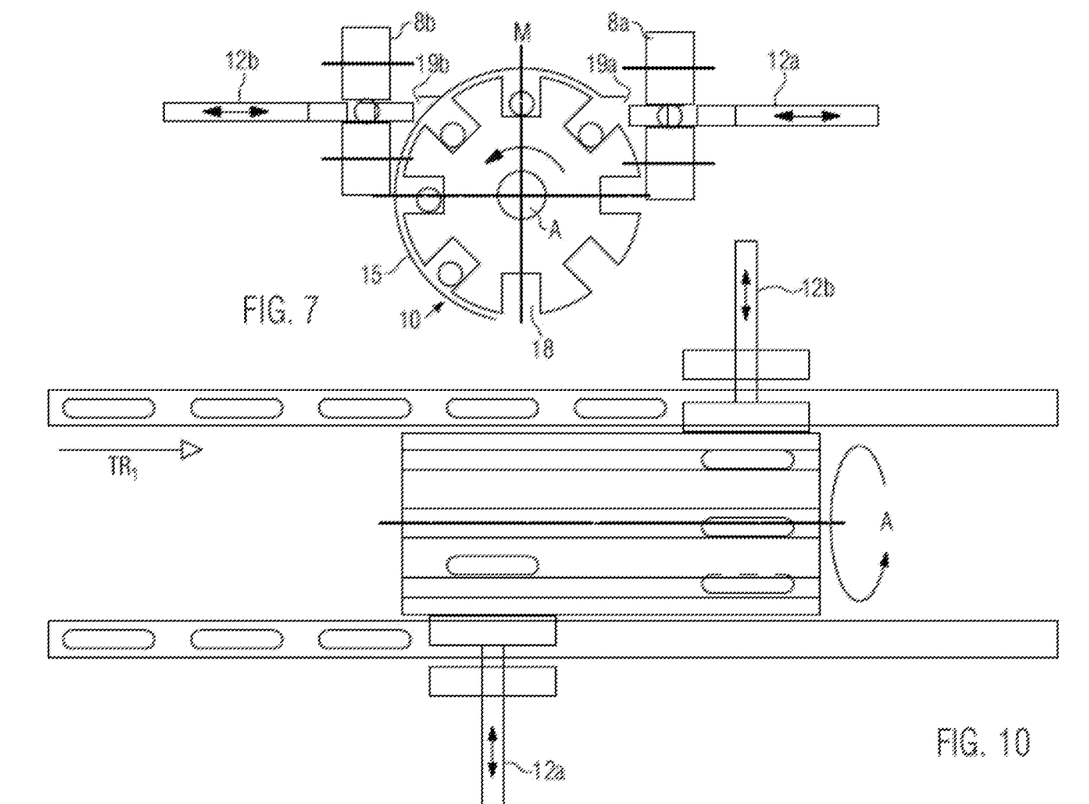
FIG. 7 shows a longitudinal section through a further embodiment according to the present disclosure with two first transport devices.
FIG. 10 coarsely shows a schematic of a top view of a further embodiment according to the present disclosure with two first transport devices.

An embodiment is shown in FIG. 7, whereby here, there are several first transport devices 8a, 8b, which are arranged at different positions. The two first transport devices 8a, 8b have corresponding ejection devices 12a, 12b in order to push the corresponding sausage portions into the corresponding inlet areas 19a, 19b. Thereby, the first transport devices 8a, 8b and the corresponding ejection devices 12a, 12b, as well as the second transport device 10 are driven by a control such that the individual accommodation compartments 11 in the corresponding accommodation area 19a, 19b, respectively are filled only by one ejection device 12a or 12b. Regarding the embodiment shown in FIG. 7, both ejection devices and accommodation areas 19a, 19b are in an opposite position with respect to the middle longitudinal axis M.

As shown in FIG. 10, it is also possible that both first transport devices 10a, 10b run in fact parallel to one another, however, both ejection devices 12a, 12b are arranged on opposite sides of the rotation axis A offset to one another so that it is possible that in an accommodation compartment 11 of a drum or a fan belt, respectively, a sausage portion may be accommodated of one of the first 12a and a second 12b ejection device. Regarding the embodiment shown in FIGS. 7 and 10, thus, several transport devices 8a, 8b may be arranged at several positions at the circumference of the second transport device 10. Even if in FIGS. 7 and 10, only the first transport device with corresponding ejection devices is shown, however, for example up to 6 transport devices 8 may be arranged.

Figure 8:
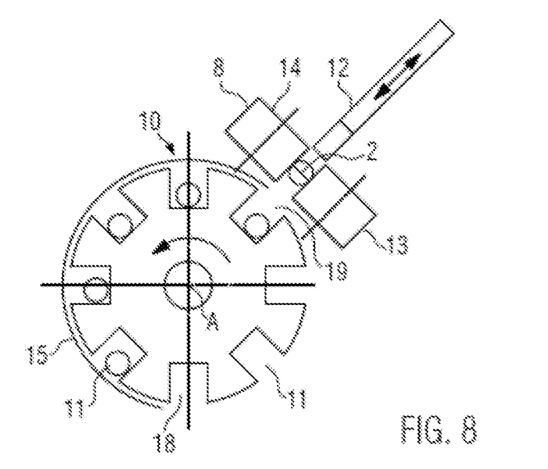
FIG. 8 shows a longitudinal section through a further embodiment according to the present disclosure with an inclined positioned first transport device.

FIG. 8 shows another embodiment of the present disclosure, according to which the transport device 8 is placed in an inclined position. This means that the transport device 8 is preferably inclined sideways about a longitudinal axis L of the sausage and/or the middle axis of the first transport device. This means that the bearing surface 16, shown in FIG. 5C, is oriented about an angle α between 0° and 180° to a horizontal plane H. Due to a corresponding inclined arrangement, the first transport device can move closer to the second transport device 10 that allows particularly careful transfer of the sausage portions. By the fact that the sausage portions are held between the transport means 13, 14, a corresponding inclined arrangement is possible in the first place. A corresponding inclined position allows that the first transport device may be arranged at an arbitrary position around the circumference of the second transport device 10.

Even if not shown, the device may comprise a control device, which controls the velocities of the first and/or the second transport device(s), in particular adapts the same to one another. Thus, the velocity of the first and second transport devices 8, 10 is variable. The velocity of the first and second transport devices also may be adapted to the velocity of a further transport device 7, which transports the sausage portions from a filling machine to the device. The control device also drives the ejection device. An optionally additional transport device 20 (shown at FIG. 6), as well, after the second transport device 10 may be driven by the control device.

With the method according to the present disclosure, e.g. a sausage portion 1 is transported via a first transport device 8. The transport means 13, 14 of the transport device reliably hold the sausage portion 1 to prevent shifting or falling down of the sausage portion. The distance a between the transport means 13, 14 was adjusted in advance to a fitting distance, which approximately corresponds to 70% to 100% of the sausage caliber. The transported sausage portions were produced in advance in the filling machine 2 shown in FIG. 6 and transported via the transport device 7 of the filling machine 2. It is possible, as outlined above, to separate the sausages due to an appropriate choice of the velocities of the transport devices 7 or 8 and to space them from one another. However, it is also possible not to create a distance and to transfer several single sausage portions simultaneously.

At least one sausage portion 1 is ejected by at least one ejection device 12 into an accommodation compartment 11 of a second transport device 1, i.e. a drum or a fan belt in a second transport direction $TR_2$. Then, the sausage portion is transported by the second transport device from an inlet area 19 to an outlet area 18. Thereby, the sausage portions 1 are preferably held by a cover 15 in the accommodation compartments 11. The cover 15 thereby preferably moves with the same circumferential velocity as the drum and/or the outer surface of the fan belt so that the relative velocity between the cover 15 and the sausage portion transported along therewith and/or the outer surface of the second transport device is possibly low. Thereby, the cover may be arranged very close at the surface of the second transport device. Preferably, the cover 15 may contact the second transport device 10, at least cover the same in sections. The portions transported by the second transport device 10 are then transferred either to a further conveyer belt 20 or an accommodation container via the outlet area 18.

The invention claimed is:

1. A device for transferring sausage portions, comprising:
    a first transport device for transporting the sausage portions in their longitudinal direction, and
    an ejection device for pushing the sausage portions from the first transport device to a second transport device, said second transport device being configured as a drum or a fan belt, wherein
    the first transport device has a lower circumferential transport means and an upper circumferential transport means between which the sausage portions are transported, and wherein the ejection device is configured such that the ejection device is movable to and fro between the upper circumferential transport means and the lower circumferential transport means.

2. The device according to claim 1, wherein the lower and upper circumferential transport means are configured as conveyer belts, a distance of which is adjustable to one another.

3. The device according to claim 1, wherein the device comprises a control device, which variably controls velocities of the first and/or second transport device and/or the ejection device.

4. The device according to claim 3, wherein the control device adapts the velocities of the first and/or second transport device and/or the ejection device to one another.

5. The device according to claim 1, wherein several ejection devices arranged one after the other are arranged for a simultaneous or delayed emittance of several sausage portions.

6. The device according to claim 1, wherein the first transport device is arranged laterally inclined.

7. The device according to claim 6, wherein the first transport device is arranged around a longitudinal axis of the sausage portions and/or a middle axis of the first transport device.

8. The device according to claim 1, wherein several transport devices are arranged at several positions at a circumference of the second transport device.

9. The device according to claim 1, wherein the second transport device has several circumferential accommodation compartments which are covered by a cover which at least extends to a part of the circumference of the second transport device and which is configured as running parallel to the second transport device.

10. The device according to claim 9, wherein the cover is further configured as a parallel running belt or a roller carpet.

11. The device according to claim 1, wherein the first transport device transports the sausage portions in a first transport direction, and wherein the ejection device pushes the sausage portions in a second transport direction which runs at about an angle of 80° to 100° to the first transport direction.

12. A filling machine for producing sausage portions, comprising:
    a hopper,
    a conveyor, a filling pipe, and a device for transferring the sausage portions, the device for transferring the sausage portions comprising:
        a first transport device for transporting the sausage portions, and an ejection device for pushing the sausage portions from the first transport device to a second transport device, said second transport device being configured as a drum or a fan belt, wherein the first transport device has a lower circumferential transport means and an upper circumferential transport means between which the sausage portions are transported.

\* \* \* \* \*